United States Patent [19]

Hsu

[11] Patent Number: 5,150,994

[45] Date of Patent: Sep. 29, 1992

[54] SPINDLE MEANS OF MACHINE CENTER

[76] Inventor: Kaven Hsu, c/o Hung Hsing Patent Service Center, P.O. Box 55-1670, Taipei, Taiwan

[21] Appl. No.: 763,576

[22] Filed: Sep. 23, 1991

[51] Int. Cl.$^5$ .................... B23C 9/00; F16C 37/00
[52] U.S. Cl. .................... 409/135; 384/241; 409/231
[58] Field of Search .................... 29/39, 53, 55; 51/168, 51/266; 409/231, 135; 408/238; 384/227, 241, 318, 320, 900

[56] References Cited

U.S. PATENT DOCUMENTS 4,519,734  5/1985  Mitchell et al. .................... 409/231
4,534,686  8/1985  Nakamura et al. .................... 409/135

Primary Examiner—William Briggs

[57] ABSTRACT

A spindle of a machine center is held in a spindle sleeve directly straightly driven by a servo-controlled motor aligned with the spindle axis for preventing any bending or twisting caused to the rotating spindle during cutting operation and having a plurality of longitudinal cooling passages parallelly longitudinally formed in the spindle sleeve proximate to an upper and a lower bearings disposed around the spindle for enhancing the cooling effect of the running spindle, and having a direct application of cooling oil mist or gas stream into the bearing systems of the spindle to greatly minimize any frictional heat or temperature raise caused from the running spindle to prevent a thermal expansion influencing the processing precision of the cutting operation.

5 Claims, 6 Drawing Sheets

1

SPINDLE MEANS OF MACHINE CENTER

BACKGROUND OF THE INVENTION

A conventional spindle means used in a machine center is shown in FIG. 1, which includes: a spindle A disposed in a spindle sleeve B having a plurality of helical or annular cooling grooves C sealed in a sleeve holder D1 of a Z-axis machine frame D, a feed port D2 formed in an outer portion of the sleeve holder D1 for supplying cooling medium or liquid into the grooves C surrounding the sleeve B for cooling down the heat caused by running friction of primary bearing A1 and secondary bearing A2, and a discharge port D3 formed in the other side of the sleeve holder D1 for discharging the heat-exchanged cooling medium.

A stream of cooling oil mist or gas may also be fed through the port D2, the grooves C and a gas-feeding hole B, radially formed in the sleeve B for cooling the bearing A1, A2 and then directed through gas discharge hole B2 of sleeve B and through the remaining coils C to be outwardly discharged from port D3 to prevent the thermal expansion caused by frictional heat of rotating bearings during cutting operation of which the thermal expansion may deviate the centering of a tool E or may influence the cutting precision, causing a cutting error of unexpected depth. At the end of spindle A, there is provided with pulley or gear set F for a speed-variating transmission driven by the motor G. A tool holding rod H is slidably held in the hollow spindle A for holding the tool E which is clamped by or released from a chuck E1 operatively controlled by an actuator J provided at an end portion of the spindle A.

In order to enhance the rigidity or strength of the sleeve B for supporting the rotational spindle A, the cooling grooves C can not be made so deeply recessed in the outside wall of the sleeve B and should also be further sealed by the holder D1 to thereby greatly reduce the cooling effect of the grooves C since they are unable to approach the bearings A1, A2 so near. Meanwhile, after performing heat-exchange in the grooves C the temperature of the cooling fluid may be raised to reduce its cooling effect when fed into the bearing environment. The frictional heat caused by the cutting operational load and the rolling operation of the bearings will not be eliminated or disspated to thereby cause a linear thermal expansion of the spindle A at an increasing length gradient of 1.3 micro meter per 100 mm length of a steel spindle per degree of temperature (Centigrade) raise.

For accelerating the processing time and for a fine processing surface of a work piece, the spindle may be rotated at a very high speed such as about ten-thousand revolutions per minute to easily increase temperature to cause linear thermal expansion which will effect a precision processing job.

The side-protruded transmission system to be driven by the motor G provided aside the spindle A may cause a sidewardly thrusting or pulling force to thereby possibly bend or twist the spindle A to influence the processing precision. The bearings effected by the single-side thrusting force may be deformed to also influence the precision of the cutting operation.

Another conventional spindle means is shown in FIG. 1A including a plurality of cutting tools T held on a carriage or disk to be engaged with the spindle A positioned above the tool disk. In order to prevent a contact or impact of the spindle head with the tool T, the spindle sleeve B should be formed as a cone shape tapered downwardly and the spindle head should be prolonged its length to thereby cause a longer linear thermal expansion by frictional heat caused during the running of the spindle means to greatly influence a processing precision.

The present inventor has found the drawbacks of the conventional spindle means of a machine center, and invented the present improved spindle means of a machine center having increased cooling effect and having a direct straight driving operation by a servo-controlled motor for preventing twisting of the spindle.

SUMMARY OF THE INVENTION

The object of the present invention is to provide a machine center having a spindle held in a spindle sleeve directly straightly driven by a servo-controlled motor aligned with the spindle axis for preventing any bending or twisting caused to the rotating spindle during cutting operation and having a plurality of longitudinal cooling passages parallelly longitudinally formed in the spindle sleeve proximate to an upper and a lower bearings disposed around the spindle for enhancing the cooling effect of the running spindle, and having a direct application of cooling oil mist or gas stream into the bearing systems of the spindle to greatly minimize any frictional heat or temperature raise caused from the running spindle to prevent a thermal expansion influencing the processing precision of the cutting operation

DETAILED DESCRIPTION

Figure 1:
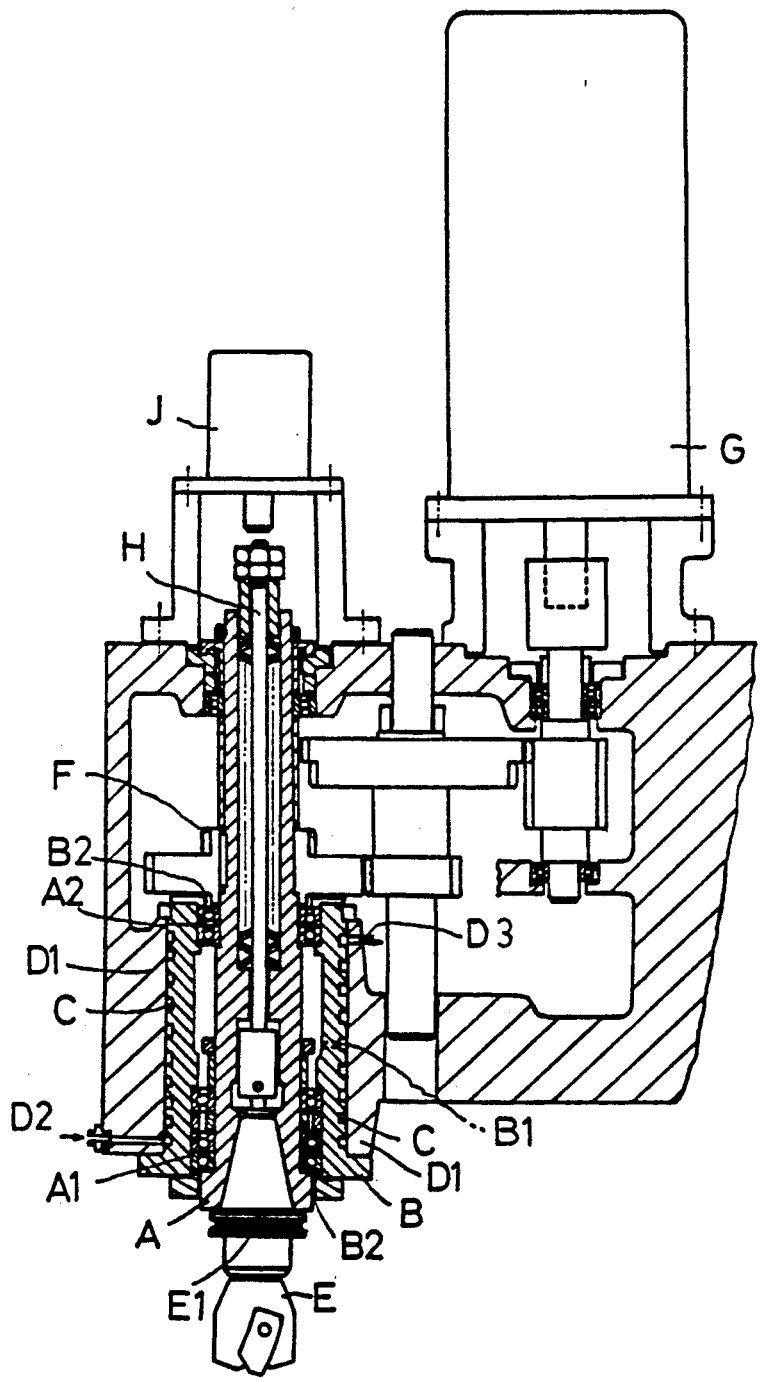
FIG. 1 is a sectional drawing showing a prior art of a conventional spindle means of a machine center.
Figure 1A:
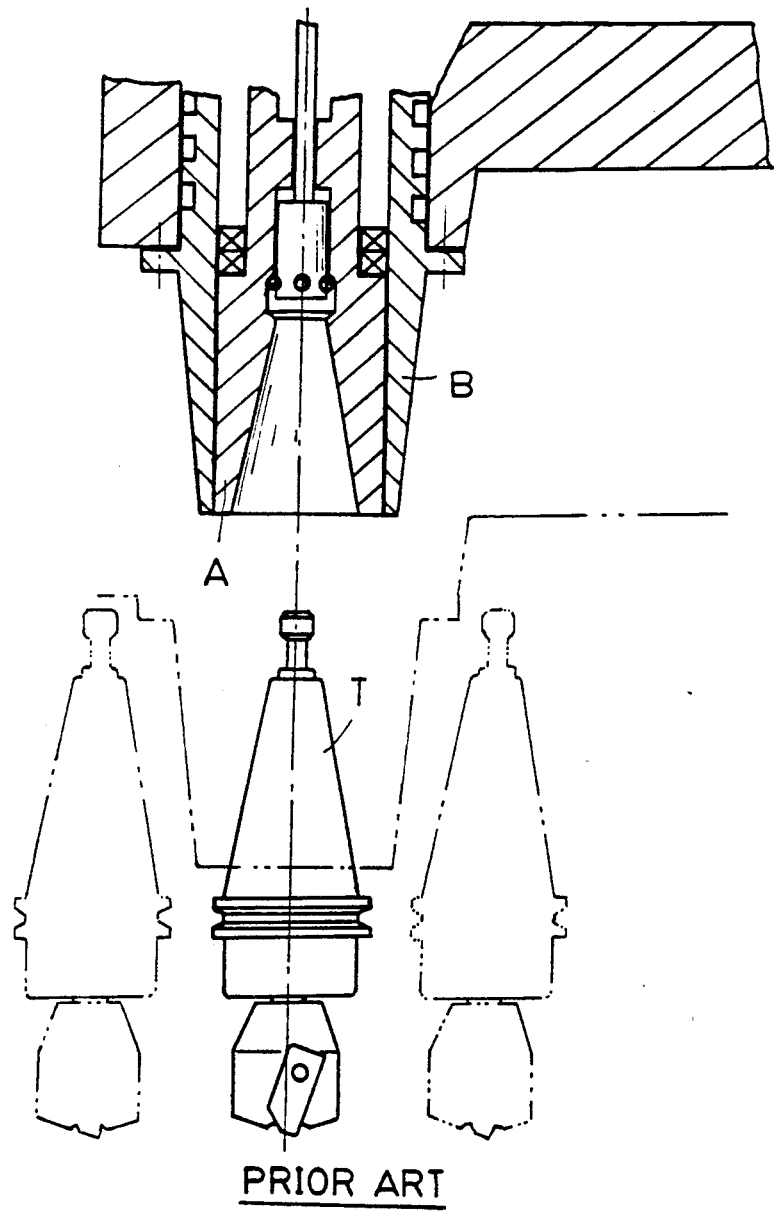
FIG. 1a shows a prior art of another conventional spindle means of a machine center.
Figure 2:
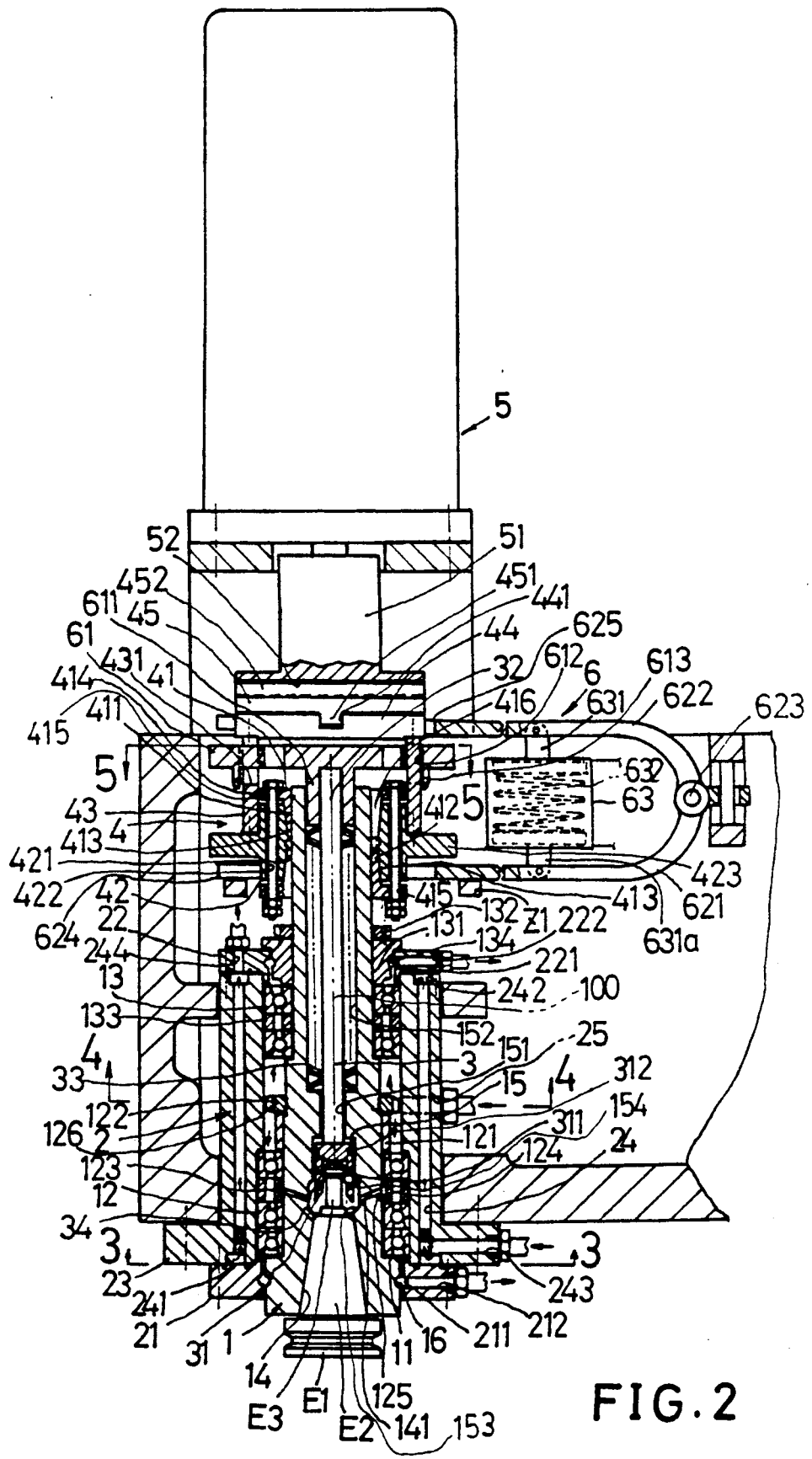
FIG. 2 is a sectional drawing of the present invention.
Figure 3:
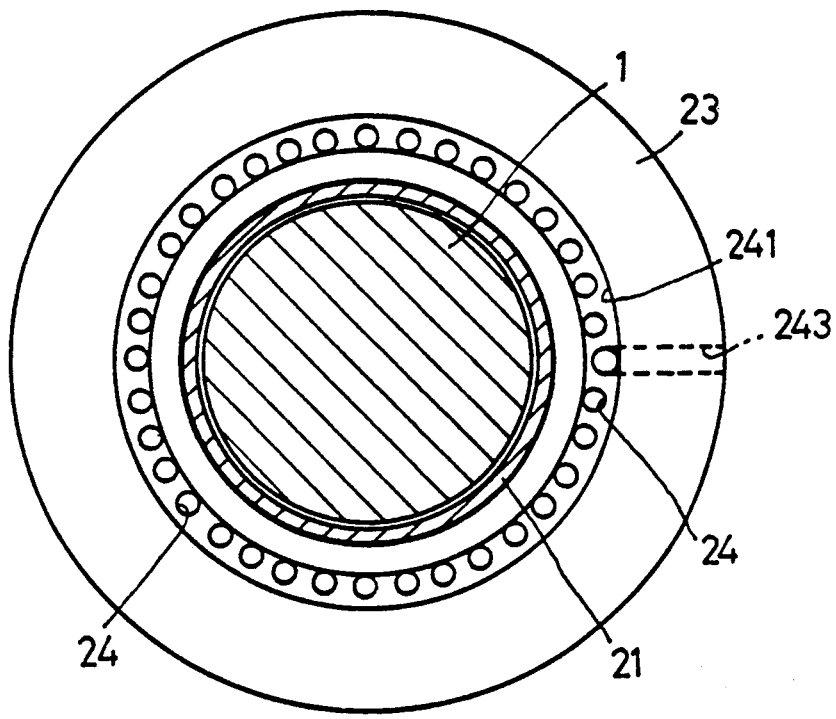
FIG. 3 is a cross sectional drawing of the present invention when viewed from 3—3 direction of FIG. 2.
Figure 4:
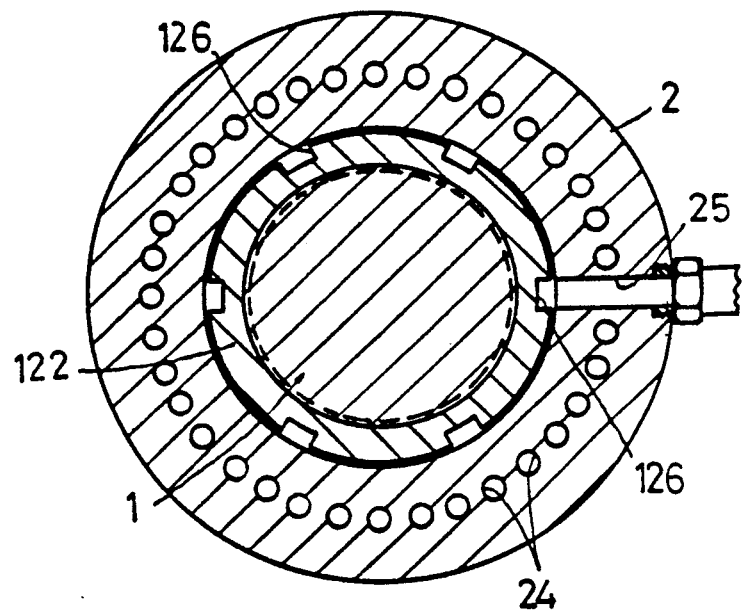
FIG. 4 is a cross sectional drawing viewed from 4—4 direction of FIG. 2.

As shown in FIGS. 2-4, the present invention comprises: a spindle 1, a spindle sleeve 2, a tool holding means 3, a transmission coupling means 4, a driving motor which may be a servo-controlled motor 5, and a tool-holding control means 6.

The spindle 1 includes: a shoulder portion 11 formed on a lower end portion of the spindle 1, a primary bearing set 12 embedded in a sleeve hole 20 of the sleeve 2 and disposed around a lower portion of the spindle 1 adjacent to the shoulder portion 11, a secondary bearing set 13 embedded in the sleeve hole 20 of the sleeve 2 and disposed around an upper portion of the spindle 1, a lower bearing cover 21 formed on a bottom portion of the sleeve 2 adjacent to the shoulder portion 11 of the spindle 1 for sealing a lower portion of the primary bearing set 12, a lower retainer ring 121 disposed around the spindle 1 sealing an upper portion of the primary bearing set 12 secured by a lower nut 122, an upper retainer ring 131 disposed around the spindle 1 for sealing an upper central portion of the secondary bearing set 13 by an upper nut 132, an upper bearing cover 22 formed on an upper portion of the spindle sleeve 2 adjacent to the upper retainer ring 131 for sealing an upper outer portion of the secondary bearing set 13, a lower spacer ring 123 inserted in the primary bearing set 12 having at least a vertical oil hole 123a communicated with a radial hole 124 and an inside annular groove 125 formed in the lower spacer ring 123, and an upper spacer ring 133 inserted in the secondary bearing set 13.

The spindle 1 is formed with a recessed cone hole 14 in a lower portion of the spindle 1 for operatively engaging a cone-head portion E2 of a tool chuck E1; and formed with a lower cylindrical hole 15 in a lower portion of the spindle 1 positioned above and communicated with the cone hole 14, a rod hole 151 positioned above and communicated with the lower cylindrical hole 15, and an upper cylindrical hole 152 formed through a central portion of the spindle 1 communicated with the rod hole 151.

The lower cylindrical hole 15 is provided for slidably holding a tool connector 31 of the tool holding means 3 therein and the rod hole 151 is provided for reciprocatively holding a tool holding rod 32. A plurality of disk-shaped springs 33 are resiliently superimposed within the upper cylindrical hole 152 disposed around the rod 32.

The spindle 1 is formed with a plurality of radial gas holes 141 communicating the cone hole 14 and the annular grooves 125, radial hole 124 and vertical hole 123a formed in the spacer ring 123 for directing cooling oil gas or mist for purging through an aperture between the cone-head portion E2 and spindle 1 for cooling the cone hole 14 and for forming a dust-proof shield for changing tool chuck E1 in the cone hole 14. An upper portion of the spindle 1 is protruded upwardly from the secondary bearing 13 to be connected with the transmission coupling means 4.

The spindle sleeve 2 rotatably holding the spindle 1 includes: a lower flange 23 formed on a lower portion of the sleeve 2 adjacent to the shoulder portion 11 of the spindle 1 and secured to a Z-axis machine frame M of the cutting machine by bolts, a plurality of longitudinal cooling passages 24 longitudinally formed through the sleeve 2 parallel to a longitudinal axis 100 of the tool holding rod 32 and the spindle 1, a first perforated plug sealed in a first longitudinal cooling passage near a feeding port 243 formed on a side portion of the spindle sleeve 2 having a small orifice 24a with a small inside diameter formed in the first perforated plug for delivering a high-pressure inlet cooling fluid in the first longitudinal cooling passage, and a second perforated plug sealed in a second longitudinal cooling passage distal from the feeding port 243 having a large orifice 24b formed in the second perforated plug with a large inside diameter larger than that of the small orifice 24a of the first perforated plug for delivering a low-pressure inlet cooling fluid in the second longitudinal cooling passage for an even flow rate when delivering the cooling liquid through the longitudinal passages 24, a lower annular-ring groove 241 annularly formed in the lower flange 23 communicated with the feeding port 243, an upper annular ring groove 242 annularly formed in an upper end portion of the sleeve 2 communicated with a discharge port 244 from which the cooling liquid after being heat exchanged may be cooled down, filtered and re-circulated through the feeding port 243, at least a radial cooling passage 25 radially formed in a middle portion of the sleeve 2 from a middle feeding port 251 for communicating a central sleeve hole 20 which is formed in the sleeve 2 and disposed around the spindle 1 for delivering cooling gas through a notch 126 formed in a lower nut 122 of the primary bearing set 12 for cooling the primary and the secondary bearing sets 12, 13.

A stream of the cooling oil gas or mist is separated into a lower stream and an upper stream; the lower stream passing through the primary bearing set 12, a lower aperture formed between the shoulder portion 11 and the lower bearing cover 21, a lower annular-ring groove comprised of a lower inner semi-circle groove 16 recessed in the shoulder portion 11 of the spindle 1 and a lower outer semi-circle groove 211 recessed in the lower bearing cover 21, and a lower discharge tube 212 formed in the lower bearing cover for centrifugally thrusting the lower cooling oil gas outwardly through the lower discharge tube 212; and the upper stream flowing through the secondary bearing set 13, an upper aperture between the upper retainer ring 131 and the upper bearing cover 22, an upper annular-ring groove comprised of an upper inner semi-circle groove 134 recessed in the upper retainer ring 131 and an upper outer semi-circle groove 221 recessed in the upper bearing cover 22, and an upper discharge tube 222 formed in the upper bearing cover 22 for centrifugally thrusting the upper cooling oil gas outwardly through the upper discharge tube 222. The oil discharge from the two tubes 212, 222 may be recovered, filtered and recirculated.

The tool holding means 3 incudes: a tool connector 31 generally cylindrical shaped having a lower opening enlarged downwardly for receiving a pulling head portion E3 of the tool chuck E1, a plurality of radial cone holes 311 radially formed in a cylindrical wall of the tool connector 31 each radial cone hole 311 tapered inwardly about a radial cone axis generally perpendicular to the longitudinal axis 100 of the spindle 1, a plurality of balls 34 each ball 34 normally resting in the radial cone hole 311 and a recessed bore hole 153 enlarged from the lower cylindrical hole 15, and operatively protruded inwardly beyond the cylindrical wall of the tool connector 31 for clamping the pulling head portion E3 of the tool chuck E1 when upwardly moving the tool connector 31 to allow a tapered shoulder portion 154 tapered downwardly outwardly in the lower portion of the spindle to urge the balls inwardly in the radial cone holes 311 for engaging the pulling head portion E3 of the tool chuck E1, a packing ring 312 jacketed on the tool connector 31 slidably sealing the lower cylindrical hole 15 in the spindle 1, and a tool holding rod 32 secured with the tool connector 31 and protruding upwardly to be secured with the tool-holding control means 6.

The transmission coupling means 4 includes: a fastener set 41, an extension collar 42, a transmission cylinder 43, a transmission disk 44, and a cross-key disk 45. The fastener 41 includes an upper fastening member 411 having a central cylindrical hole 410 slidably engageably with the spindle 1, an upper outer conical surface 413 tapered downwardly to be engageable with an upper cone hole 421 formed in an upper portion of the extension collar 42, an upper fastener flange 414, a plurality of bolt holes 415 and an axial slot 416 formed through the fastening member 411 adapted to be fastened by the extension collar 42 at cone hole 421; and a lower fastening member 412 having a central cylindrical hole 410 slidably engageable with the spindle 1, a lower outer conical surface 413a tapered upwardly to be engageable with a lower cone hole 421a formed in a lower portion of the extension collar 42, a lower fastener flange 414 having bolt holes 415 formed therein and axial slot 416 formed in the lower fastening member 412, both upper and lower fastening members 411, 412 being firmly secured on the extension collar 42 by inserting a plurality of bolts through a plurality of bolt holes 422 formed in the extension collar 42 and in the fastener flanges 414.

Figure 5:
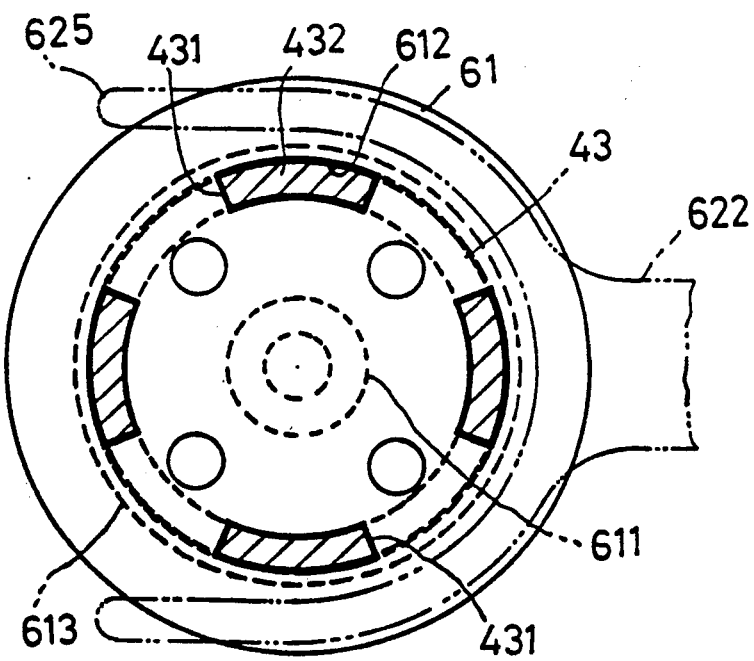
FIG. 5 is a cross sectional drawing as viewed from 5—5 direction of FIG. 2.
Figure 6:
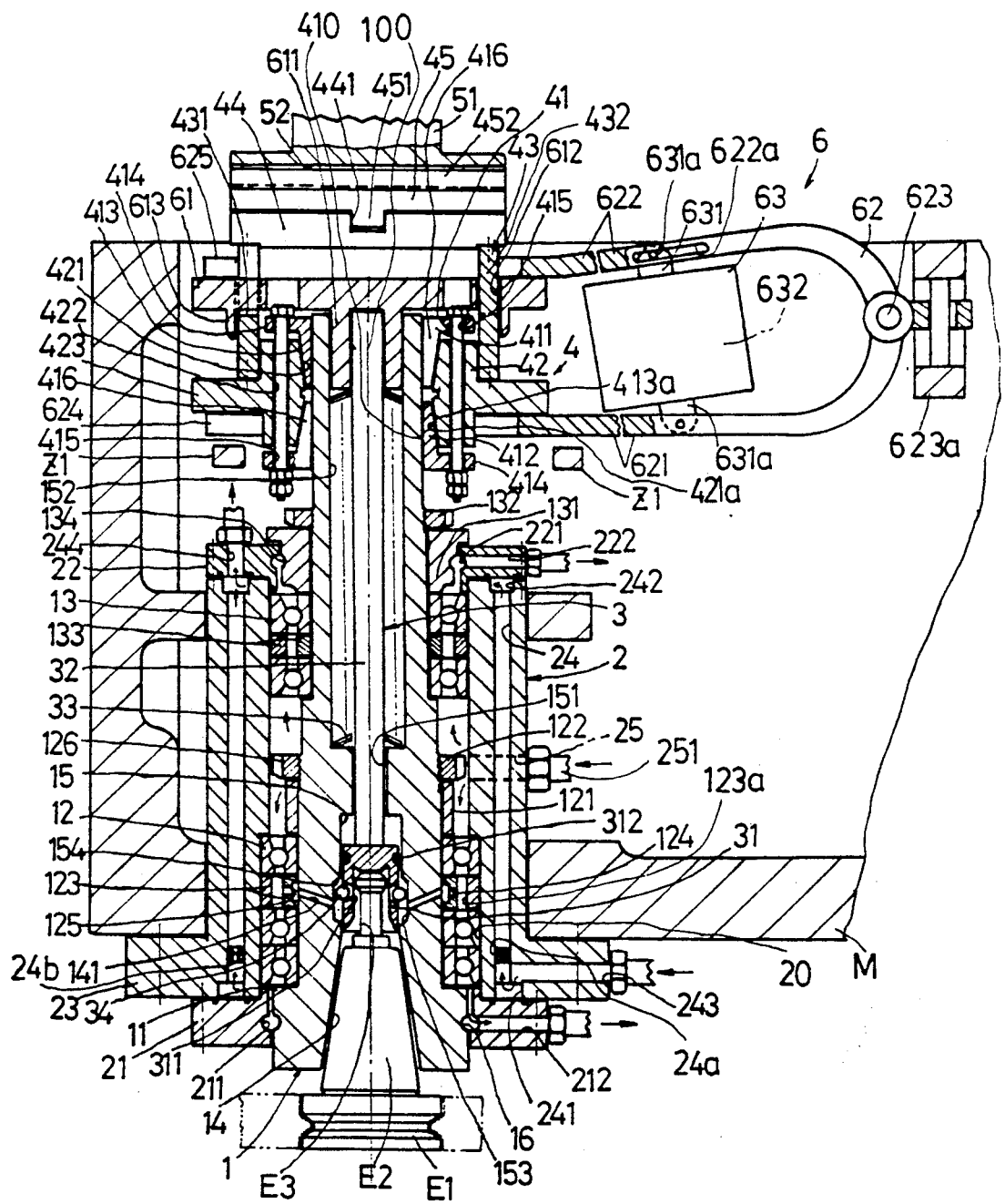
FIG. 6 is an illustration showing a releasing operation of a tool holding means of the present invention.

The transmission cylinder 43 includes a lower cylinder portion secured with an annular transmission flange 423 circumferentially radially formed on the extension collar 42, a plurality of vertical slots 431 formed in an upper portion of the cylinder 43 to correspondingly form a plurality of vertical teeth 432 as shown in FIG. 5 each tooth adjacent to each neighbouring slot 431 for slidably engaging a tool-popping disk 61 of the tool-holding control means 6, and an upper cylinder portion of the transmission cylinder 43 secured with the transmission disk 44.

The cross-key disk 45 includes a lower diametrical key 451 formed on a bottom portion of the cross-key disk 45 engageable with a key groove 441 formed in the transmission disk 44, and an upper diametrical key 452 projectively crossing with the lower key 451 and engageable with a driving key groove 52 of a driving disk 51 secured with the motor 5.

The tool-holding control means 6 includes: a tool-popping disk 61, a tool-holding controller 62, and a single-way driver 63. The tool-popping disk 61 includes a central sleeve portion 611 having an inside hole in the sleeve portion 611 engageably secured with an upper end portion of the tool holding rod 32 and an outer cylindrical wall slidably engageable with the upper cylindrical hole 152 of the spindle 1 and normally urged by the plurality of disk-shaped springs 33 held in the upper cylindrical hole 152 for pulling the tool connector 31 upwardly for urging the balls 34 inwardly for clamping the pulling head portion E3 of tool E against the tapered shoulder portion 154 formed in between the enlarged bore hole 153 and the lower cylindrical hole 15 in the spindle for engaging the cone-head portion E2 of tool E with the cone hole 14, a plurality of arcuate slots 612 formed in the tool-popping disk 61 each arcuate slot engageable with each vertical tooth 432 of the transmission cylinder 43 for a reciprocative sliding movement with each other as shown in FIG. 5, and an annular extension 613 circumferentially formed under an outer periphery of the tool-popping disk 61 for shielding a whistling noise caused from the vertical slots 431 formed in the transmission disk 43 when rotated.

The tool-holding controller 62 includes: a supporting calliper arm 621 operatively retained on a stopper Z1 mounted on the Z-axis machine frame and a tool-releasing calliper arm 622 hinged at a pivotal member 623 slidably held on a bracket 623a fixed on the Z-axis machine frame, a bifurcated member 625 secured with the tool-dismantling calliper arm 622 depressibly retaining the tool-popping disk 61, and an annular ring member 624 rotatably engageable with annular transmission flange 423 for rotatably supporting the transmission flange 423.

The single-way driver 63 includes: an upper shaft 631 protruding from one end of the driver 63 having a shaft pin 631a slidably engageable with a pin slot 622a formed in the tool-releasing calliper arm 622 for pivotally connecting the tool-releasing calliper arm 622, and a lower shaft 631a protruding from the other end of the driver 63 for pivotally connecting the supporting calliper arm 621, and a driving mechanism 632 operatively extending and retracting the upper shaft 631 which may be selected from a solenoid having a restoring spring normally extending the upper shaft 631 upwardly and electromagnetically retracting the upper shaft 631 downwardly when powered, and selected from a bidirectional motor (not shown) electrically controlled for extending or retracting the upper shaft 631. Upon a retraction of the upper shaft 631 to retract the two calliper arms 622, 621, the tool-popping disk 61 will be depressed downwardly by the bifurcated member 625 to lower the rod 32 to release the balls 34 from clamping the pulling head portion E3 of the tool E to disengage the cone portion E2 of the rod E from the cone hole 14 of the spindle 1 for changing tool.

When using the present invention, the cooling liquid may be directed into the plurality of longitudinal cooling passages 24 for cooling the sleeve 2, the bearing 12, 13, the spindle 1 and the tool holding means 3, an oil gas or mist stream may also be fed through the radial cooling passage 25 of which the oil gas stream will be led through the central hole 20 in the sleeve 2, the lower bearing set 12, the oil holes 123a, 124, 125 in spacer 123, the radial gas hole 141 into the bore hole 153 in the lower cylindrical hole 15 to discharge through an aperture between the cone hole 14 and the cone portion E2 of the tool chuck E1, and also through the upper bearing set 13, thereby causing a thoroughly heat exchange operation for removing operational and frictional heat caused during the machine running for preventing a linear thermal expansion of the tool E and for ensuring a precision cutting operation by this invention.

Since the longitudinal cooling passages 24 are made longitudinally in the sleeve 2, which can be made to approximate the bearings 12, 13 and spindle 1 as much as possible without greatly reducing a strength or influencing a rigidity of the machine, thereby being superior to a conventional cutting machine.

When mounting a tool E by an automatic tool changer or an automatic tool control machanism (not shown) onto the spindle 1 of the present invention, the single-way driver 63 is actuated to extend the upper shaft 631 and the disk-shaped springs 33 may resiliently urge the central sleeve portion 611 of the tool-popping disk 61 upwardly to raise the tool holding rod 32 and the tool connector 31 to poke the balls 34 for coupling the pulling head portion E3 of the tool chuck E1 with the tool holding means 3 and upon a driving of the servo-controlled motor 5 due to the coupling of the driving disk 51 of the motor with the cross-key disk 45 and the transmission disk 44 secured with the transmission cylinder 43 which is engaged with the disk 61 and secured with the collar 42 and the spindle 1, the spindle 1, the rod 32 and the tool E will be simultaneously rotated about the common longitudinal axis 100 for a direct axial driving by the motor 5 to thereby prevent any side thrusting force, twisting or bending moment of the spindle 1 and tool for ensuring a precision tool operation.

The oil gas or mist sprayed through the aperture between the cone portion E2 of the tool chuck E1 and the cone hole 14 of the spindle may serve as a dust-proof shield for preventing contamination on the tool and the machine.

The present invention may also be used in any turning machine, lathe, milling machine, etc. Even the embodiment as shown in the figure is vertically erected, it may also be modified to a horizontal machine by those skilled in the art.

I claim:

1. A spindle means of machine center comprising: a spindle rotatably mounted in a spindle sleeve fixed in a machine frame;
   a tool holding means operatively connecting a tool chuck for clamping a tool thereon and held in a central portion in said spindle;
   a driving motor operatively driving spindle for rotating said tool connected therewith by means of a transmission coupling means coupling said spindle and said motor; said spindle, said tool, said tool holding means, said transmission coupling means and said motor defining a common longitudinal axis about said axis said spindle and said tool being rotated; and
   a tool-holding control means normally connecting said tool holding means with said spindle for rotating said spindle and said tool connected on said tool holding means, and operatively separating said tool holding means from said spindle;
   said spindle sleeve including: a lower flange formed on a lower portion of the sleeve adjacent to a lower shoulder portion of the spindle and secured to a machine frame, a plurality of longitudinal cooling passages longitudinally formed through the sleeve parallel to the longitudinal axis of the spindle, a first perforated plug sealed in a first longitudinal cooling passage of said plurality of said longitudinal cooling passages near a feeding port formed on a side portion of the spindle sleeve having a small orifice with a small inside diameter formed in the first perforated plug for directing a cooling liquid of high pressure fed in the first longitudinal cooling passage and a second perforated plug sealed in a second longitudinal cooling passage of said cooling passages distal from the feeding port having a large orifice formed in the second perforated plug with a large inside diameter larger than that of the small orifice of the first perforated plug for directing a cooling liquid of low pressure fed in the second longitudinal cooling passage for an even flow rate when delivering the cooling liquid through the longitudinal passages, a lower annular-ring groove annularly formed in a lower flange of the sleeve communicated with the feeding port, an upper annular ring groove annularly formed in an upper end portion of the sleeve communicated with a discharge port from which the cooling liquid is discharged, and at least a radial cooling passage radially formed in the sleeve for communicating a central sleeve hole formed in the sleeve and disposed around the spindle for delivering a cooling gas through a notch formed in a lower nut of a primary bearing set, which is formed between the spindle and the sleeve and is positioned below a secondary bearing set formed between said spindle and said sleeve for cooling the primary bearing set and the secondary bearing set.

2. A spindle means according to claim 1, wherein a stream of a cooling oil gas or mist is separated into a lower stream and an upper stream; the lower stream passing through the primary bearing set, a lower aperture formed between the shoulder portion and a lower bearing cover sealing the primary bearing set, a lower annular-ring groove comprised of a lower inner semi-circle groove recessed in the shoulder portion of the spindle and a lower outer semi-circle groove recessed in the lower bearing cover, and a lower discharge tube formed in the lower bearing cover for centrifugally thrusting the lower stream of said cooling oil gas outwardly through the lower discharge tube; and the upper stream flowing through the secondary bearing set, an upper aperture between an upper retainer ring and the upper bearing cover retaining the secondary bearing set, an upper annular-ring groove comprised of an upper inner semi-circle groove recessed in the upper retainer ring and an upper outer semi-circle groove recessed in the upper bearing cover, and an upper discharge tube formed in the upper bearing cover for centrifugally thrusting the upper stream of said cooling oil gas outwardly through the upper discharge tube.

3. A spindle means according to claim 1, wherein said spindle includes: a cone hole recessed in a lower portion of the spindle for operatively engaging a cone-head portion of a tool chuck for clamping a tool on the chuck;
   a lower cylindrical hole formed in a lower portion of the spindle positioned above and communicated with the cone hole, a rod hole positioned above and communicated with the lower cylindrical hole, and an upper cylindrical hole formed through a central portion of the spindle communicated with the rod hole, said lower cylindrical hole provided for slidably holding a connector of the tool holding means therein and the rod hole provided for reciprocatively holding a tool holding rod, and the upper cylindrical hole being superimposed with a plurality of disk-shaped springs therein disposed around the rod, and a plurality of radial gas holes radially formed in the spindle communicated with a radial cooling passage in said sleeve and communicating the cone hole and a plurality of oil passages formed in a spacer ring inserted in a bearing set between the spindle and the sleeve for directing cooling oil gas or mist for purging through an aperture between the cone-head portion of the tool chuck and the spindle for cooling use.

4. A spindle means according to claim 1, wherein said transmission coupling means includes: a fastener set, an extension collar, a transmission cylinder, a transmission disk, and a cross-key disk fastener including an upper fastening member having a central cylindrical hole engageable with the spindle, an upper outer conical surface tapered downwardly to be engageable with an upper cone hole formed in an upper portion of the extension collar, an upper fastener flange, a plurality of bolt holes and an axial slot formed through the fastening member; and a lower fastening member having a central cylindrical hole slidably engageable with the spindle, a lower outer conical surface tapered upwardly to be engageable with a lower cone hole formed in a lower portion of the extension collar, a lower fastener flange having bolt holes formed therein and an axial slot formed in the lower fastening member, both upper and lower fastening members being firmly secured on the extension collar by inserting a plurality of bolts through a plurality of bolt holes formed in the extension collar and in the fastener flanges; said transmission cylinder including a lower cylinder portion secured with an annular transmission flange circumferentially radially formed on the extension collar, a plurality of vertical slots formed in an upper portion of the transmission cylinder to correspondingly form a plurality of vertical teeth, each said vertical tooth adjacent to each neighboring vertical slot for slidably engaging a tool-popping disk of the tool-holding control means, and an upper cylinder portion of the transmission cylinder secured with the transmission disk; and said cross-key disk including a lower diametrical key formed on a bottom portion of the cross-key disk engageable with a key groove formed in the transmission disk, and an upper diametrical key projectively crossing with the lower key and engageable with a driving key groove formed in a driving disk secured with the motor; said tool-holding control means including: said tool-popping disk including a central sleeve portion having an inside hole formed in the sleeve portion engageably secured with an upper end portion of the tool holding rod and an outer cylindrical wall slidably engageable with the upper cylindrical hole of the spindle and normally urged by a plurality of disk-shaped springs held in an upper cylindrical hole in the spindle for pulling a tool connector of the tool holding means upwardly for urging a plurality of balls inwardly for clamping a pulling head portion of the tool chuck against a tapered shoulder portion formed in between an enlarged bore hole and a lower cylindrical hole in the spindle for engaging the spindle with the tool, a plurality of arcuate slots formed in the tool-popping disk each arcuate slot engageable with a vertical tooth of a transmission cylinder of said coupling means for a reciprocative sliding movement with each other, and an annular extension circumferentially formed under an outer periphery of the tool-popping disk for shielding a whistling noise caused from the coupling means; and a tool-holding controller including: a supporting calliper arm operatively retained on a stopper mounted on the machine frame and a tool-releasing calliper arm hinged at a pivotal member slidably held on a bracket fixed on the machine frame, a bifurcated member secured with the tool-dismantling calliper arm depressibly retaining the tool-popping disk, and an annular ring member rotatably engageable with an annular transmission flange of an extension collar of said coupling means, said two calliper arms being operated by a single-way driver.

5. A spindle means according to claim 4, wherein said single-way driver includes: an upper shaft protruding from one end of the driver having a shaft pin slidably engageable with a pin slot formed in the tool-releasing calliper arm for pivotally connecting the tool-releasing calliper arm, and a lower shaft protruding from the other end of the driver for pivotally connecting the supporting calliper arm, and a driving machanism operatively extending and retracting the upper shaft selected from a solenoid having a restoring spring normally extending the upper shaft upwardly and electromagnetically retracting the upper shaft downwardly when powered, and from a bidirectional motor electrically controlled for extending or retracting the upper shaft, whereby upon a retraction of the upper shaft to retract the two calliper arms, the tool-popping disk will be depressed downwardly by the bifurcated member to release the tool chuck from said spindle.

* * * * *